(12) United States Patent
Muramatsu et al.

(10) Patent No.: US 7,276,811 B2
(45) Date of Patent: Oct. 2, 2007

(54) SUBMARINE POWER FEEDING SYSTEM HAVING SUBMARINE FEEDING CABLES AND POWER FEEDING BRANCHING DEVICES

(75) Inventors: Jun Muramatsu, Tokyo (JP); Kenichi Asakawa, Yokosuka (JP); Katsuyoshi Kawaguchi, Yokosuka (JP)

(73) Assignees: NEC Corporation, Tokyo (JP); Independent Administrative Intitiution, Japan Agency for Marine-Earth Science and Technology, Kanagawa (JP)

( * ) Notice: Subject to any disclaimer, the term of this patent is extended or adjusted under 35 U.S.C. 154(b) by 0 days.

(21) Appl. No.: 11/605,299

(22) Filed: Nov. 29, 2006

(65) Prior Publication Data

US 2007/0069588 A1    Mar. 29, 2007

Related U.S. Application Data

(62) Division of application No. 10/687,931, filed on Oct. 20, 2003, now Pat. No. 7,166,933.

(30) Foreign Application Priority Data

Oct. 12, 2002   (JP)   .............................. 2002-305918

(51) Int. Cl.
*H02J 1/10*   (2006.01)
*H02J 3/00*   (2006.01)

(52) U.S. Cl. ......................................... 307/19; 307/58

(58) Field of Classification Search .................. 307/82, 307/83, 147, 58, 69; 363/143; 323/332
See application file for complete search history.

(56) References Cited

U.S. PATENT DOCUMENTS 5,841,205 A    11/1998   Webb (Continued)

FOREIGN PATENT DOCUMENTS

JP    54-35820    8/1952

(Continued)

*Primary Examiner*—Michael Sherry
*Assistant Examiner*—Michael Rutland-Wallis
(74) *Attorney, Agent, or Firm*—Foley & Lardner LLP

(57) ABSTRACT

A submarine power feeding branching device comprises a constant current-constant current converter which isolates an input side for a trunk submarine cable from an output side for a branch submarine cable. The converter receives a first constant current and produces a second constant current by using the first constant current. The second constant current is supplied to the output side while the first constant current is returned to the input side. Because the input side and the output side are isolated, it is easy to add/remove the device to/from a submarine power feeding system. Intensity of the second constant current can be controlled by controlling duty ratios of switches included in the converter. Thus, it is possible that the intensity of the second constant current is equal to that of the first constant current. Therefore, a submarine repeater can be provided along either the trunk cable or the branch cable.

3 Claims, 16 Drawing Sheets

U.S. PATENT DOCUMENTS

| | | |
|---|---|---|
| 6,184,631 B1 | 2/2001 | Noma et al. |
| 6,275,396 B1 * | 8/2001 | Farrar .................. 363/65 |
| 6,873,063 B1 * | 3/2005 | Appleford et al. .......... 307/149 |
| 2003/0117025 A1 * | 6/2003 | Rouquette ................. 307/147 |
| 2003/0230936 A1 | 12/2003 | Muramatsu |
| 2003/0231516 A1 * | 12/2003 | Farrar et al. ................. 363/65 |

FOREIGN PATENT DOCUMENTS

| | | |
|---|---|---|
| JP | 51-68709 | 6/1976 |
| JP | 51-134013 | 11/1976 |
| JP | 63-204824 | 8/1988 |
| JP | 57-30430 | 2/1992 |
| JP | 8-97692 | 4/1996 |
| JP | 11-059800 | 3/1999 |
| JP | 11-155135 A | 6/1999 |
| JP | 2000-23365 | 1/2000 |
| JP | 2000-295861 A | 10/2000 |
| JP | 2001-086747 A | 3/2001 |
| JP | 2001-095240 A | 4/2001 |
| JP | 2001-309553 A | 11/2001 |
| JP | 2002-164820 | 6/2002 |
| JP | 2003-244032 A | 8/2003 |

* cited by examiner

FIG. 4 PRIOR ART

SUBMARINE POWER FEEDING SYSTEM HAVING SUBMARINE FEEDING CABLES AND POWER FEEDING BRANCHING DEVICES

CROSS-REFERENCE TO RELATED PATENT APPLICATIONS

This application is a division of application Ser. No. 10/687,931, filed Oct. 20, 2003, now U.S. Pat. No. 7,166,933, which claims priority from Japanese Patent Application No. 2002-305918, filed Oct. 21, 2002, by Jun Muramatsu, Kenichi Asakawa, Katsuyoshi Kawaguchi, both of which are incorporated herein by reference in their entirety. This application claims only subject matter disclosed in the parent application and therefore presents no new matter.

BACKGROUND OF THE INVENTION

This invention relates to a submarine electric power feeding branching device and a submarine electric power feeding system using the submarine electric power feeding branching device. In particular, this invention relates to a submarine power feeding branching device suitable for arranging submarine cables in mesh pattern and constructing a submarine power feeding system having the submarine cables arranged in mesh pattern.

In fields of researches for submarine earthquakes, ocean environment or the like, there are demands for arranging a large number of submarine observation devices, such as seismometers, tsunami instruments, current meters, hydrometers or the like, in two dimensional arrangement (or a matrix) on the bottom of the sea to collect various data from the submarine observation devices.

To meet such demands, it is possible to construct a observation system that comprises submarine observation devices, which are provided on the bottom of the sea, and submarine cables, which are used for feeding electric power to the submarine observation devices and continuously collecting data from (or communicating with) the submarine observation devices.

However, it is impractical that the submarine cables individually connect the submarine observation devices to a land observation device(s). Furthermore, when an observation system has plural submarine observation devices which are connected to a submarine cable in series, it possesses low reliability. This is because the submarine observation devices located between a failure point and the end of the submarine cable can not receive electric power from a land observation device and communicate with the land observation device when the failure occurs in the submarine cable. Thus, a submarine cable system (or power feeding system) having submarine cables arranged in mesh or lattice pattern is necessary to construct an observation system having a large number of submarine observation devices arranged in two dimensional arrangement (or a matrix) and possessing high reliability.

SUMMARY OF THE INVENTION

It is therefore an object of this invention to provide a submarine electric power feeding branching device capable of constructing a submarine electric power feeding system having submarine cables arranged in mesh pattern and possessing high reliability.

Other objects of this invention will become clear as the description proceeds.

According to a first aspect of this invention, a power feeding branching device comprises a constant current-constant current converter having an input terminal, a first output terminal and a second output terminal which is electrically isolated from both the input terminal and the first output terminal. A controller is connected to the constant current-constant current converter and makes the constant current-constant current converter utilize a first constant current supplied to the input terminal to produce a second constant current and a restored first constant current. The second constant current and the restored first constant current are to be supplied to the second output terminal and the first output terminal, respectively.

The power feeding branching device may further comprise a bypass circuit connected between the input terminal and the first output terminal. The bypass circuit bypasses the constant current-constant current converter to allow the first constant current instead of the restored first constant current to lead from the input terminal to the first input terminal when the input terminal has an electrical potential higher than a predetermined potential.

Furthermore, the power feeding branching device may comprises a bypass diode connected between the second output terminal and a ground terminal.

According to a second aspect of this invention, a power feeding system includes a plurality of trunk cables connected to feeding devices, a plurality of branch cables each of which is provided between adjacent two of the trunk cables, and a plurality of power feeding branching devices for connecting the branch cables with the trunk cables. Each of the power feeding branching devices comprises a constant current-constant current converter having an input terminal, a first output terminal and a second output terminal which is electrically isolated from both the input terminal and the first output terminal. A controller is connected to the constant current-constant current converter and makes the constant current-constant current converter utilize a first constant current supplied to the input terminal to produce a second constant current and a restored first constant current. The second constant current and the restored first constant current are to be supplied to the second output terminal and the first output terminal, respectively.

In the power feeding system, the power feeding branching devices are classified into two types. One of the types leads the second constant current from the constant current-constant current converter to the second output terminal. The other of the types leads the second constant current from the second output terminal to constant current-constant current converter. Each of the branch cables is connected between two second output terminals of two of the power feeding branching devices different from each other in type.

BRIEF DESCRIPTION OF THE DRAWINGS

FIG. 4 is a block diagram of a related submarine electric power feeding system;

DETAILED DESCRIPTION OF THE PREFERRED EMBODIMENTS

Description will be at first directed to a conventional submarine cable system. As the conventional submarine cable system, a communication submarine cable system is well known.

The communication submarine cable system comprise a long communication submarine cable including a power feeder inside to feed electric power for repeaters provided along the communication submarine cable. The power feeder comprises a single conductor to reduce diameter and cost of the communication submarine cable. Seawater is used as a return circuit in the communication submarine cable system. The communication submarine cable system adopts a constant current feeding system to make easy insulation between circuits in each repeater and strengthen tolerance for failure of a short circuit of the submarine cable.

If the repeaters are fed with constant voltage, an electronic circuit in each repeater must have a grounded terminal. Accordingly, the electronic circuit has a higher voltage part and a lower voltage part. Therefore, the electronic circuit needs expensive electronic components which can withstand high voltage. Furthermore, dimensions of the electronic circuit tend to become large to maintain reliability regarding insulation between the electronic circuit and the seawater.

As it is, the electronic circuit in each repeater need not have the ground terminal because the repeaters are fed with constant current. Accordingly, differences of voltages are relatively small in the electronic circuit and the expensive electronic components which can withstand the high voltage are unnecessary for the electronic circuit. Furthermore, the electronic circuit is easily insulated from the seawater by covering it in whole with an insulator. In addition, the constant current feeding system can feed the constant current as far as a short circuit failure point from land feeding device through the submarine cable which is short circuited. In a case of the constant voltage feeding system, the communication submarine cable system is considerably affected by drop of electrical potential at the short circuit failure point.

Figure 1:
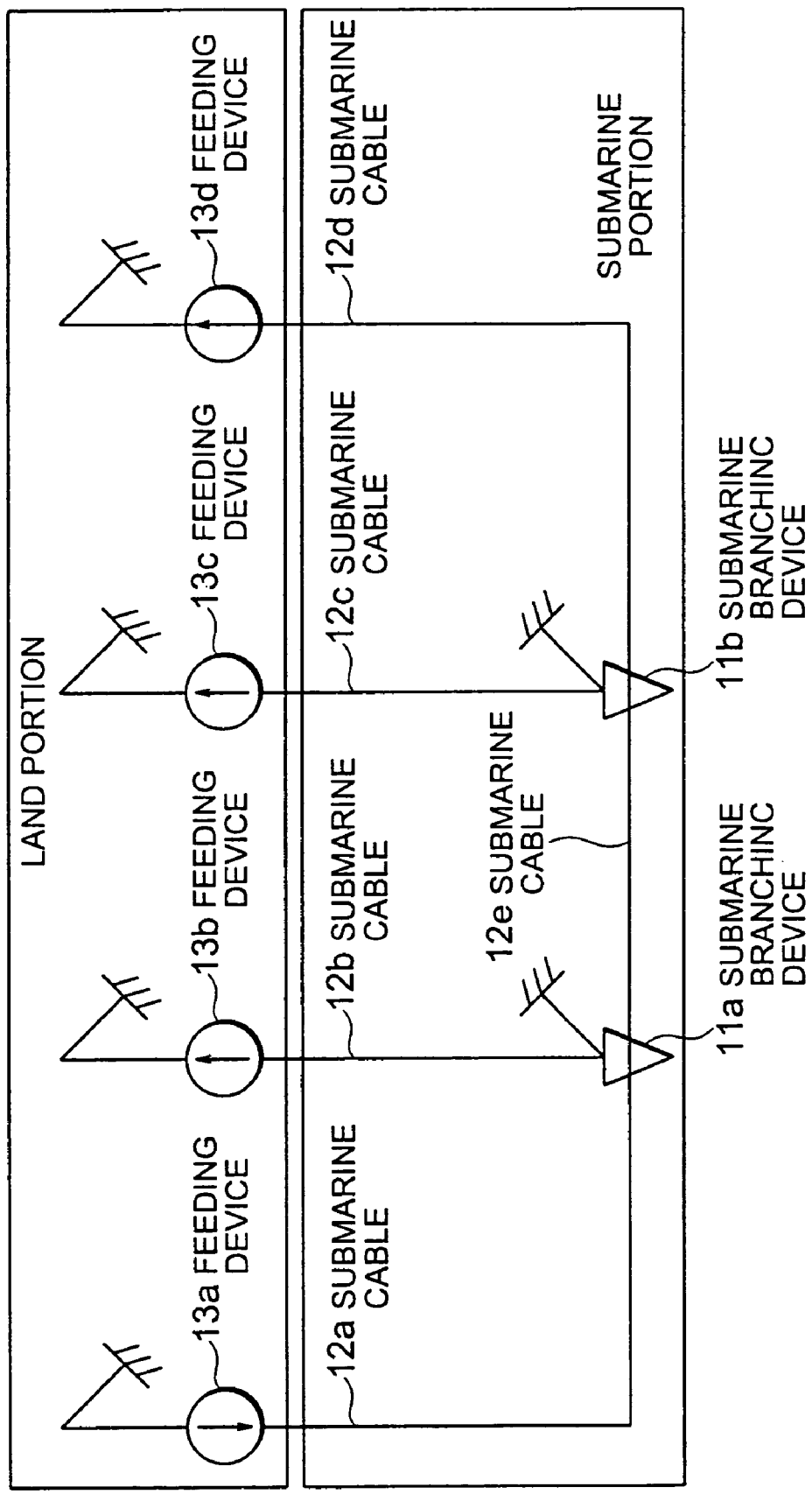
FIG. 1 is a schematic diagram of a communication submarine cable system.

Referring to FIG. 1, the description is made about an existing communication submarine cable system having submarine branching devices.

In FIG. 1, the communication submarine cable system comprises submarine branching devices 11a and 11b, submarine cables 12a-12e and feeding devices 13a-13d. While the submarine cables 12a, 12e and 12d serve as a main submarine cable, each of the submarine cables 12b and 12c serves as a branch submarine cable.

It may seem that the communication submarine cable system is applicable to a hydrographic observation system. However, such a system can comprise a comb submarine cable network but it can not comprise a submarine cable network having a lattice or mesh arrangement. This is because each branch cable 12b, 12c must be connected to the feeding device 13b, 13c at one end and grounded to the seawater at the other end.

Figure 2:
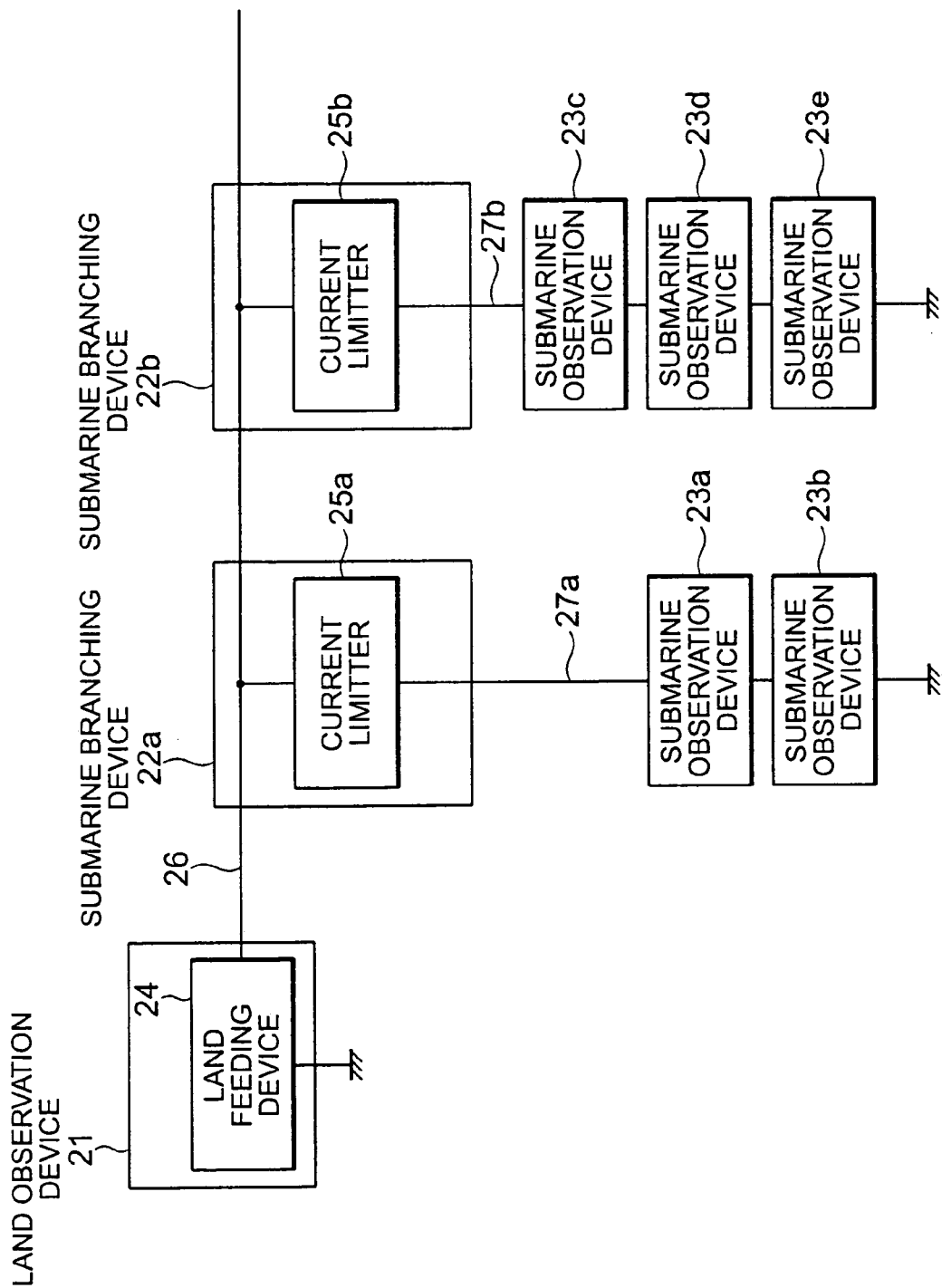
FIG. 2 is a block diagram of a conventional submarine cable power feeding system.

FIG. 2 is a block diagram of a conventional submarine cable power feeding system designed with referring to the above mentioned communication submarine cable system.

The system of FIG. 2 comprises a land observation device 21 located on land, submarine branching devices 22a, 22b located on the bottom of the sea, and submarine observation devices 23a-23e also located on the bottom of the sea. While the land observation device 21 comprises a land feeding device 24, each of the submarine branching devices 22a, 22b comprises a current limiter 25a, 25b.

The land feeding device 24 feeds a first constant current to a trunk feeder line 26. Upon receiving the first constant current, each submarine branching device 22a, 22b uses the current limiter 24a, 24b to feed a second constant current to a branch feeder line 27a, 27b (or the submarine observation device 23a-23b, 23c-23d).

Figure 3:
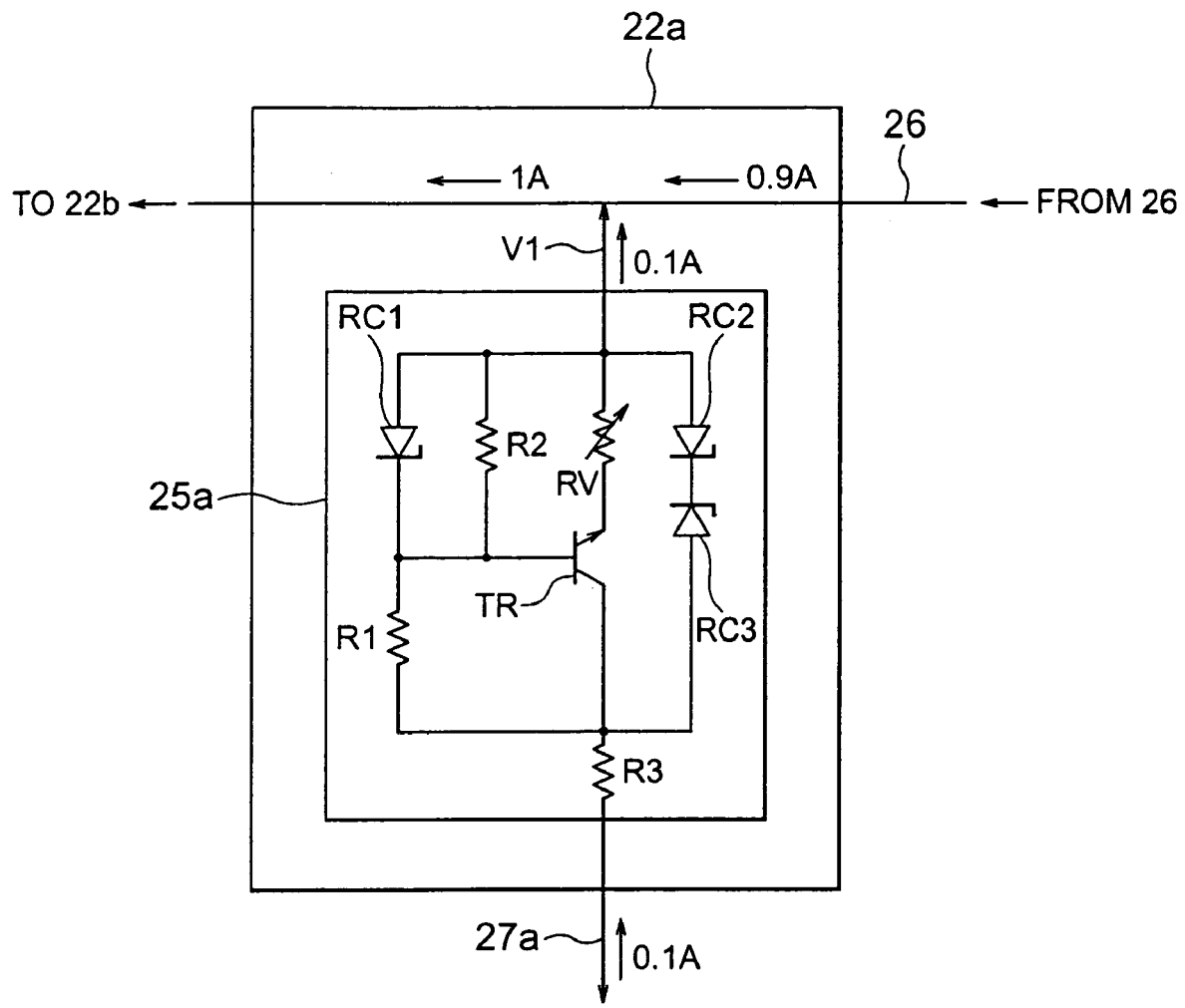
FIG. 3 is a circuit diagram of a current limiter used in a submarine branching device for the submarine cable power feeding system of FIG. 2.

The current limiter 25a is composed, for example, as illustrated in FIG. 3. The current limiter 25b is similar to the current limiter 25a in structure. In FIG. 3, the feeding current on the trunk feeder line 26 is equal to 1 [A] while the feeding current on the branch feeder line 27a is equal to 0.1 [A]. However, the feeding current on the branch feeder line 27a is varied by adjusting a variable resistor RV. That is, the feeding current on the branch feeder line 27a is decided by the Zener voltage of a Zener diode RC1 and a resistance of the variable resistor RV. An emitter current of a transistor TR is held constant because the Zener voltage is stabilized. Such a submarine power feeding system is disclosed in Japanese Unexamined Patent Publication No. 2001-309553.

The submarine power feeding system has some problems as follow.

First, as understood from FIG. 2, the submarine power feeding system has a comb shape. That is, use of the submarine branching device as shown in FIG. 3 makes possible to contract a comb shaped submarine power feeding system. However, it is hard to construct a lattice or mesh arrangement of cables for a submarine power feeding system by the use of the submarine branching devices. This is because the submarine branching devices that are provided to adjacent branch feeding lines must form pairs to construct the lattice arrangement of the cables. In such a case, it is difficult to match a first current produced by one of each pair with a second current produced by the other of the pair though the first current must be matched with the second current.

Secondly, the submarine power feeding system of FIG. 2 has disadvantage of difficulty in adding and removing the submarine branching device(s). This is because each branching device (or the variable resistor thereof) must be adjusted in response to variation of the load though it is located on the bottom of the sea.

Thirdly, the submarine power feeding system can not operate when the trunk feeder line 26 is short circuited. This is because the trunk feeder line 26 has an electric potential of about 0 [V] and the submarine branching devices 22a and 22b are inoperative when the trunk feeder line 26 is short circuited.

Fourthly, the submarine branching device is an inefficient device. This is because the submarine branching device uses resistors to limits the feeding current on the branch feeder line. That is, the resistors waste electric power. Additionally, the submarine branching device must be designed with consideration of heat radiated by the resistors.

Fifthly, the submarine power feeding system needs plural submarine branching devices which have different specifications. This is because the second constant current on the branch feeder line is different from the first constant current on the trunk feeder line.

Sixthly, the submarine branching device is not insulated between an input side and an output side. Electrical potential difference between the input side and the output side of the submarine branching device must be smaller than withstand voltage of electronic devices of the submarine branching device. In other words, the submarine branching device restricts freedom of design of the submarine power feeding system.

A proposal has been made about a submarine electric power feeding system having submarine cables arranged in mesh pattern. Such a submarine power feeding system is disclosed in Japanese Unexamined Patent Publication No. 2003-244032.

Figure 4:
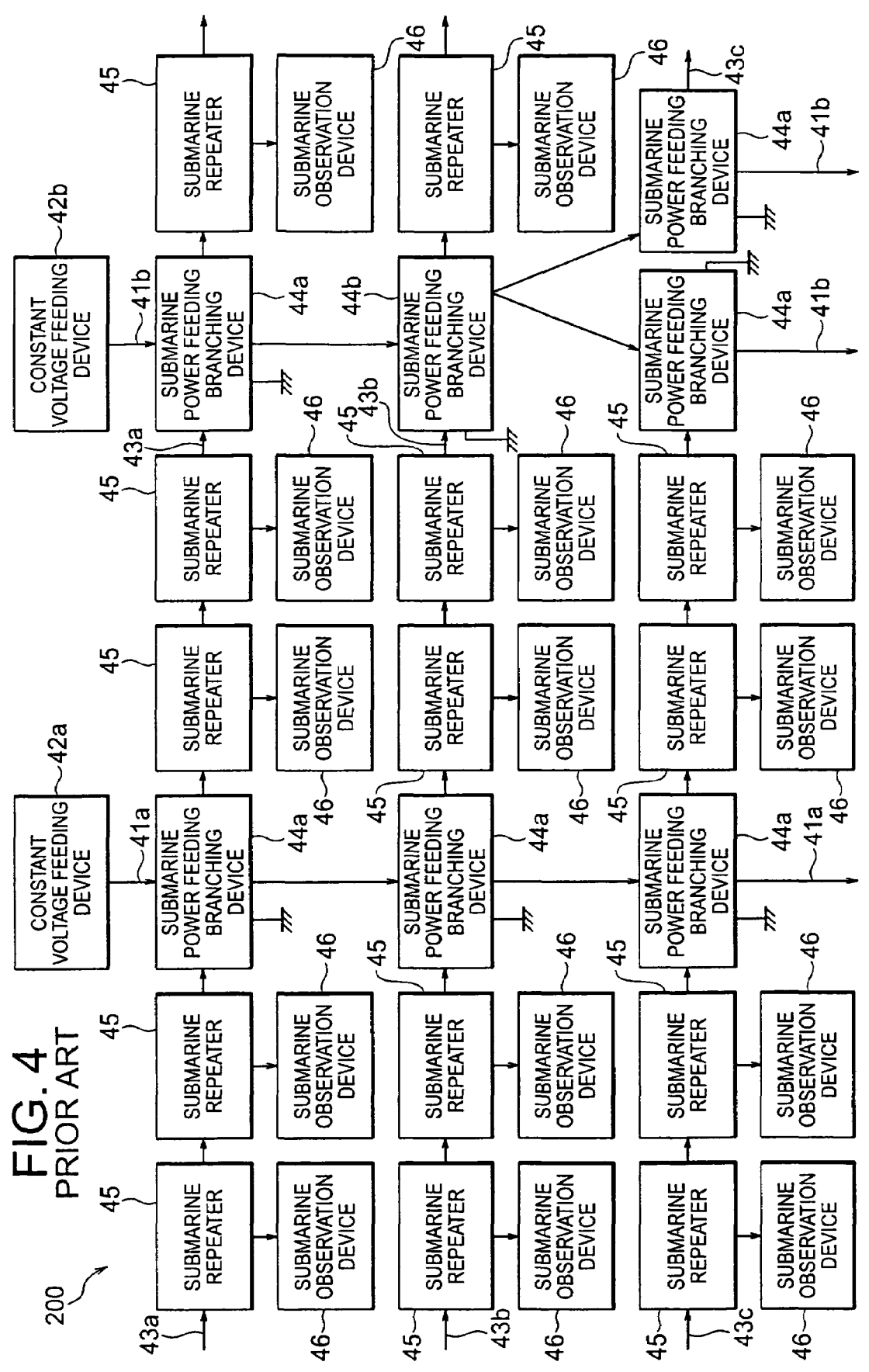

FIG. 4 shows the proposed submarine electric power feeding system. The submarine power feeding system comprises main backbone cables 41a and 41b connected to land constant voltage feeding devices 42a and 42b respectively. Sub backbone cables 43a, 43b and 43c are connected to the main backbone cables 41a and 41b by the use of submarine power feeding branching devices 44a and 44b. Submarine repeaters 45 are connected to any one of the sub backbone cables 43a, 43b and 43c between any one pair of the submarine power feeding branching devices 44a and 44b. A submarine observation device 46 is connected to each of the submarine repeaters 45.

The submarine power feeding system of FIG. 4 adopts a constant voltage feeding system for the main backbone cables and a constant current feeding system for the sub backbone cables.

Because of the constant voltage feeding system, each of the submarine power feeding branching devices 44a and 44b must be grounded. This means that each of the submarine power feeding branching devices has a circuit including higher voltage circuitry and lower voltage circuit circuitry. Accordingly, expensive electronic components which can withstand high voltage are necessary for the power feeding branching devices. Furthermore, the circuit of the power feeding branching device tends to be large to maintain insulation between itself and seawater.

Referring to FIGS. 5 to 11, description will proceed to a submarine electric power feeding system according to a first embodiment of this invention.

Figure 5:
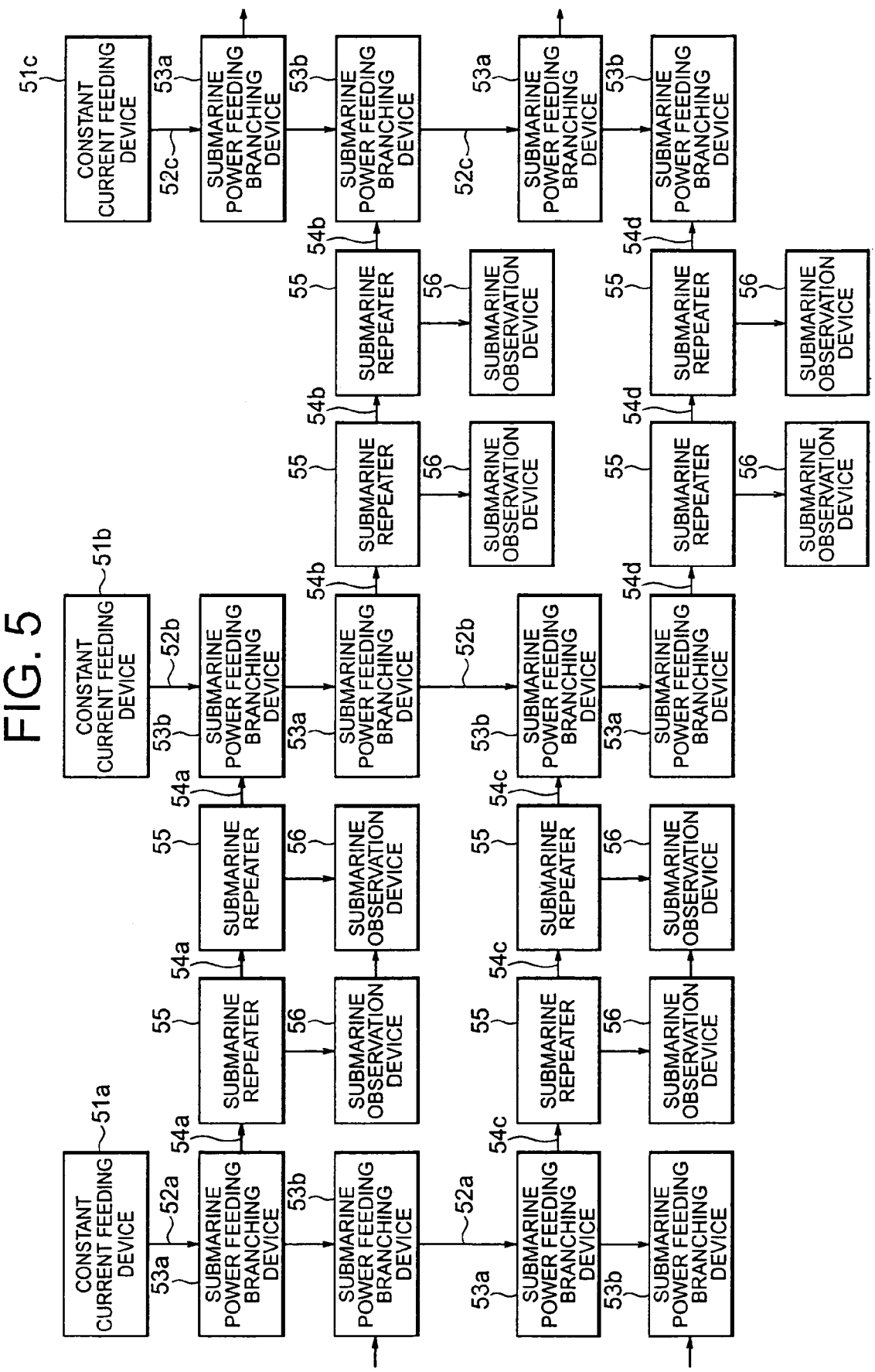
FIG. 5 is a block diagram of a submarine electric power feeding system according to a first embodiment of this invention.

FIG. 5 shows a block diagram of the submarine electric power feeding system. The submarine electric power feeding system comprises a plurality of constant current feeding device 51a, 51b and 53c which are provided in land stations (not shown) located apart from one another.

The constant current feeding device 51a, 51b and 51c is connected to trunk submarine cables 52a, 52b and 52c respectively. The trunk submarine cables 52a, 52b and 52c generally extends offshore. The greater part of each of the trunk submarine cables 52a, 52b and 52c is placed on the bottom of the sea.

Two types of submarine power feeding branching devices 53a and 53b are provided along each of the trunk submarine cables 52a, 52b and 52c. In other words, the submarine power feeding branching devices 53a and 53b are interposed in each of the trunk submarine cables 52a, 52b and 52c. The submarine power feeding branching device 53a having a first type and the submarine power feeding branching device 53b having a second type are fundamentally similar to each other in structure. However, the first type 53a produces constant current flowing from the inside to an output terminal thereof while the second type 53b produces constant current flowing from an output terminal thereof to the inside.

Each of the submarine power feeding branching devices 53a is a counterpart of any one of the submarine power feeding branching devices 53b. In other words, the first type 53a and the second type 53b of the submarine power feeding branching devices make a pair. Companions of each pair of the submarine power feeding branching devices 53a and 53b are interposed in adjacent two of the trunk submarine cables 52a-52c. For instance, the submarine power feeding branching device 53a interposed in the trunk submarine cable 52a is a companion to the submarine power feeding branching device 53b interposed in the trunk submarine cable 52b. Besides, the submarine power feeding branching device 53a interposed in the trunk submarine cable 52b is a companion to the submarine power feeding branching device 53b interposed in the trunk submarine cable 52c.

Branch submarine cables 54a, 54b, 54c and 54d are connected between companions of the pairs of the submarine power feeding branching devices 53a and 53b. The branch submarine cables are generally placed on the bottom of the sea. The branch submarine cables may be approximately perpendicular to the trunk submarine cables 52a, 52b and 52c. The trunk submarine cables and the branch submarine cables are ideally arranged in mesh or lattice pattern. However, the configuration of the trunk and the branch submarine cables is not limited in the mesh pattern. The configuration is changed because of not only landform of the seabed but also the other factors. The branch submarine cables and the trunk submarine cables serve a net or mesh power feeding line.

Submarine repeaters 55 are interposed in (or provided along) the brunch submarine cables 54a, 54b, 54c and 54d. The repeaters 55 are connected to submarine observation devices 56. The submarine observation devices 56 are placed on the bottom of the sea. The submarine observation devices 56 may be arranged in second dimensional arrangement (or a matrix).

With this structure, the land constant current feeding devices 51a, 51b and 51c feed first constant currents to the submarine power feeding branching devices 53a and 53b through the trunk submarine cables 52a, 52b and 52c.

Each of the submarine power feeding branching devices 53a feeds a second constant current to the branch submarine cable 54a, 54b, 54c or 54d when it receives the first constant current fed from the constant current feeding device 51a, 51b or 51c. On the other hand, each of the submarine power feeding branching devices 53b absorbs the second constant current fed from the submarine power feeding branching devices 53a which companions thereto. Here, the seawater is used as a return circuit for each of the trunk and the branch submarine cables.

The submarine repeaters 55 have a structure well known in the art. Each of the submarine repeaters 55 produces constant voltage from the second constant current fed from the submarine power feeding branching devices 53a to feed it for the submarine observation device 56 connected thereto.

The submarine observation devices 56 also have a structure well known in the art. While each of the submarine observation devices 56 receives the constant voltage fed from the submarine repeater 55 connected thereto, it performs regular observation and produces observation data. The observation data produced by the submarine observation devices 56 are transmitted to a land observation device(s) provided in the land station(s) through the branch submarine cable(s) and trunk submarine cable(s).

Because the submarine power feeding system adopts the constant current feeding system for the trunk submarine cables 52a, 52b and 52c, a plurality of the submarine power feeding branching devices 53a and 53b can be connected in series. Therefore, it is easy to extend the trunk submarine cables 52a, 52b and 52c and add additional submarine power feeding branching devices. In addition, it is easy to provide additional submarine repeaters along the trunk submarine cables 52a, 52b and 52c together with additional observation devices. Thus, the submarine power feeding system can be expanded over a wide area with a mesh pattern of submarine cables as illustrated in FIG. 5.

The submarine power feeding system also uses the constant current feeding system for feeding electric power to the branch submarine cables 54a, 54b, 54c and 54d. Therefore, it is easy to provide additional submarine repeaters along the branch submarine cables 52a, 52b and 52c together with additional observation devices.

Each of the submarine repeaters is fed with electrical power from two of the submarine feeding branching device 53a and 53b. Accordingly, the submarine power feeding system has tolerance for failure of a short circuit. Theoretically, even when only one short circuit occurs on the trunk and the branch submarine cables of the submarine power feeding system, all of the submarine repeaters provided to the branch submarine cables 54a-54d can be fed with electric power.

Next, the submarine power feeding branching device 53a will be described in more detail with referring to FIG. 6.

Figure 6:
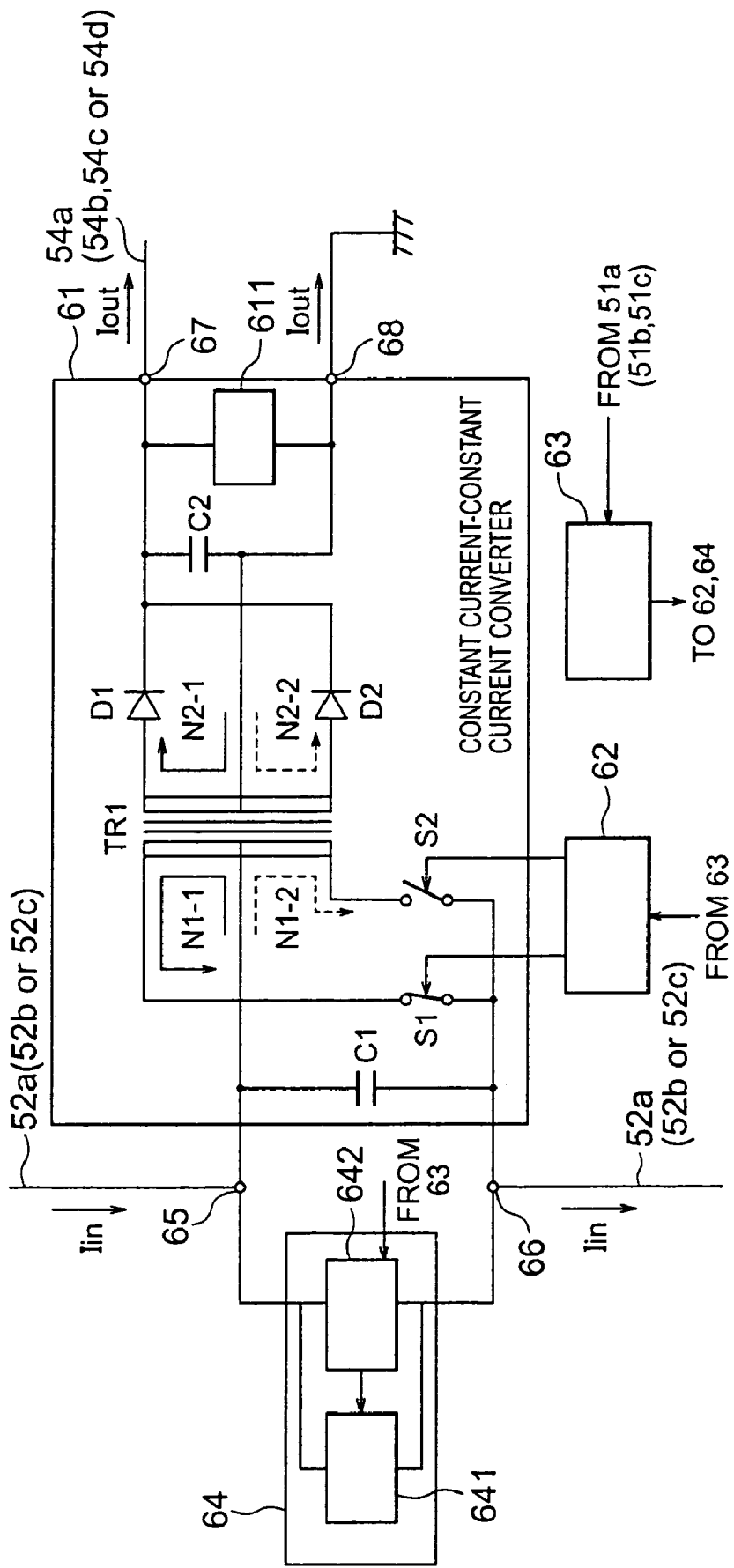
FIG. 6 is a schematic circuit diagram of a submarine power feeding branching device used in the submarine electric power feeding system of FIG. 5.

FIG. 6 shows an internal construction of the submarine power feeding branching device 53a. As illustrated in FIG. 6, the submarine power feeding branching device 53a comprises a constant current-constant current converter 61, a switch controller 62, a communication device 63 and a bypass circuit 64. The submarine power feeding branching device 53a is housed in a pressure-resistant case (not shown).

The constant current-constant current converter 61 has a pair of input (or primary) side terminals and a pair of output (or secondary) side terminals. The input side terminals are electrically isolated from the output side terminals. The input side terminals of the constant current-constant current converter 61 are connected to an input terminal 65 and a first output terminal 66 of the submarine power feeding branching device 53a. The output side terminals of the constant current-constant current converter 61 serve as a second output terminal 67 and the ground terminal 68 of the submarine power feeding branching device 53a.

The constant current-constant current converter 61 comprises a transformer TR1 having primary and secondary windings. The primary winding is connected to the input terminal 65 at the midpoint thereof while the second winding is connected to the ground terminal 68 at the midpoint thereof. A first condenser C1 is connected between the input terminal 65 and the first output terminal 66. A first switch S1 is connected between one end of the primary winding and the first output terminal 66. A second switch S2 is connected between the other end of the primary winding and the first output terminal 66. Semiconductor switches, such as MOSFETs, bipolar transistors or the like, may be used for the first and the second switches S1 and S2. A first diode D1 is connected between one end of the secondary winding and the second output terminal 67 while a second diode D2 is connected to the other end of the secondary winding and the second output terminal 67. A second condenser C2 is connected between the second output terminal 67 and the ground terminal 68. A bypass diode 611 is connected between the second output terminal 67 and the ground terminal 68.

While the first condenser C1 and the first and the second switches S1 and S2 form a square waveform producing portion. The first and the second diode D1 and D2 and the second condenser C2 forms a rectifying smoothing portion.

The switch controller 62 controls each of the switches S1 and S2 to make it an on state or an off state. When the first switch S1 is in the on state and the second switch S2 is in the off state, the current supplied to the input terminal 65 flows in the primary winding of the transformer TR1 as shown by a solid line arrow N1-1. At this time, a secondary side current flows in the secondary winding of the transformer TR1 as shown by a solid line arrow N2-1. On the other hand, when the first switch S1 is in the off state and the second switch S2 is in the on state, the current supplied to the input terminal 65 oppositely flows in the primary winding of the transformer TR1 as shown by a broken line arrow N1-2. At this time, the secondary side current flows in the secondary winding of the transformer TR1 as shown by a broken line arrow N2-2. Thus, the switch controller 62 produces square wave currents in the primary winding of the transformer TR1 by controlling the switches S1 and S2. The square wave currents are added to each other and returns to the first constant current. In other words, the square waveform producing portion produces a restored first constant current from the square wave currents to supply it to the first output terminal 66.

The bypass circuit 64 comprises a switching circuit 641 and a voltage detecting circuit 642 for controlling the switch circuit 641. The switching circuit 641 is normally in an off state. The voltage detecting circuit 642 detects a voltage difference between the input terminal 65 and the first output terminal 66. The voltage detecting circuit 642 makes the switching circuit 641 an on state when it detects the voltage difference equal to or larger than a predetermined value.

The communication device 63 is connected to the land observation device or the like provided in the land station (not shown) through, for example, optical fibers provided in the submarine trunk cables and the submarine branch cables. In addition, the communication device 63 is connected to the switch controller 62 and the voltage detecting circuit 642.

The communication device 63 receives a control signal (or a command) transmitted from the land observation device to send it for the switch controller 62 and/or the voltage detecting circuit 642. Furthermore, the communication device 63 transmits a measurement signal representing measured results concerning voltage and current at any points in the submarine power feeding branching device 53a.

The description will be soon made about the operation of the submarine power feeding branching device 53a. Hereinafter, it is assumed that the submarine power feeding branching device 53a is connected to the trunk submarine cable 52a and the branching submarine cable 54a.

The first constant current fed to the input terminal 65 through the trunk submarine cable 52a is supplied to both of the condenser C1 and the midpoint of the primary winding of the transformer TR1. While the switches S1 and S2 are alternately repeatedly changed between the on and the off states, primary current with the square waves flows in the primary winding of the transformer TR1.

The switch controller 62 controls the switches S1 and S2 in a manner as described later in more detail to generate the square waves of the primary side current in the primary winding of the transformer TR1.

The condenser C1 absorbs the first constant current flowing in the trunk submarine cable 52a to prevent abnormal high voltage from occurring at the input terminal 65 in a case where both of the switches S1 and S2 are in the off state. The condenser C1 further prevents noises produced by the operation of the switches S1 and S2 from being transmitted to the trunk submarine cable 52a.

The transformer TR1 isolates between the trunk submarine cable 52a and the branch submarine cable 54a while it supplies power of the primary (or input) side thereof to the secondary (or output) side thereof. That is, the transformer TR1 produces the secondary side current with square waves corresponding to the square waves of the primary side current.

A combination of the diodes D1 and D2 and the capacitor C2 rectifies and smoothes the secondary side current and produces an output constant current. The output constant current is supplied to the branch submarine cable 54a through the second output terminal 67 as the second constant current.

The bypass diode 611 bypasses a surplus current fed from the submarine power feeding branching device 53b which companions to the present submarine power feeding branching device 53a through the branch submarine cable 54a, when the output current is smaller than that of the submarine power feeding branching device 53b. The surplus current may occur when the submarine power feeding branching device 53a has a failure(s) anywhere. The bypass diode 611 has a cathode connected to the second output terminal 67. In the submarine power feeding branching device 53b, a bypass diode comprises an anode connected to a second output terminal (i.e. the branch submarine cable 54a) differently from the bypass diode 611.

The bypass circuit 64 detects overvoltage of the input terminal 101 to bypass the first constant current supplied to the input terminal 65 for the first output terminal 66. The overvoltage may occur when the secondary wiring is opened or when each switch S1 or S2 and/or the switching controller 62 is out of order. In such a case, the first constant current supplied to the input terminal 65 bypasses the constant current-constant current converter 61 and thereby the bypass circuit 64 prevents excessive voltage from being given to the submarine power feeding branching device 53a.

The voltage detecting circuit 642 detects the overvoltage of the input terminal 101 to control the switching circuit 641. That is, the voltage detecting circuit 642 supplies a control signal for the switching circuit 641 when it detects the overvoltage of the input terminal 101. The switching circuit 641 is normally in the off state as mentioned above. Upon receiving the control signal from the voltage detecting circuit 642, the switching circuit 641 changes from the off state to the on state. Thus, the constant current-constant current converter is bypassed by the bypass circuit 64.

After the overvoltage is detected once, the voltage detecting circuit 642 keeps the switching circuit 641 being in the on state until it receives a command signal transmitted from the land station through the communication device 63. This is made to prevent the switching circuit 641 from chattering. When the voltage detecting circuit 642 receives the command signal from the land station, it returns the switching circuit to the original (i.e. off or open) state.

Next, the operation of the switches S1 and S2 will be described with referring to FIGS. 7 and 8.

Figure 7:
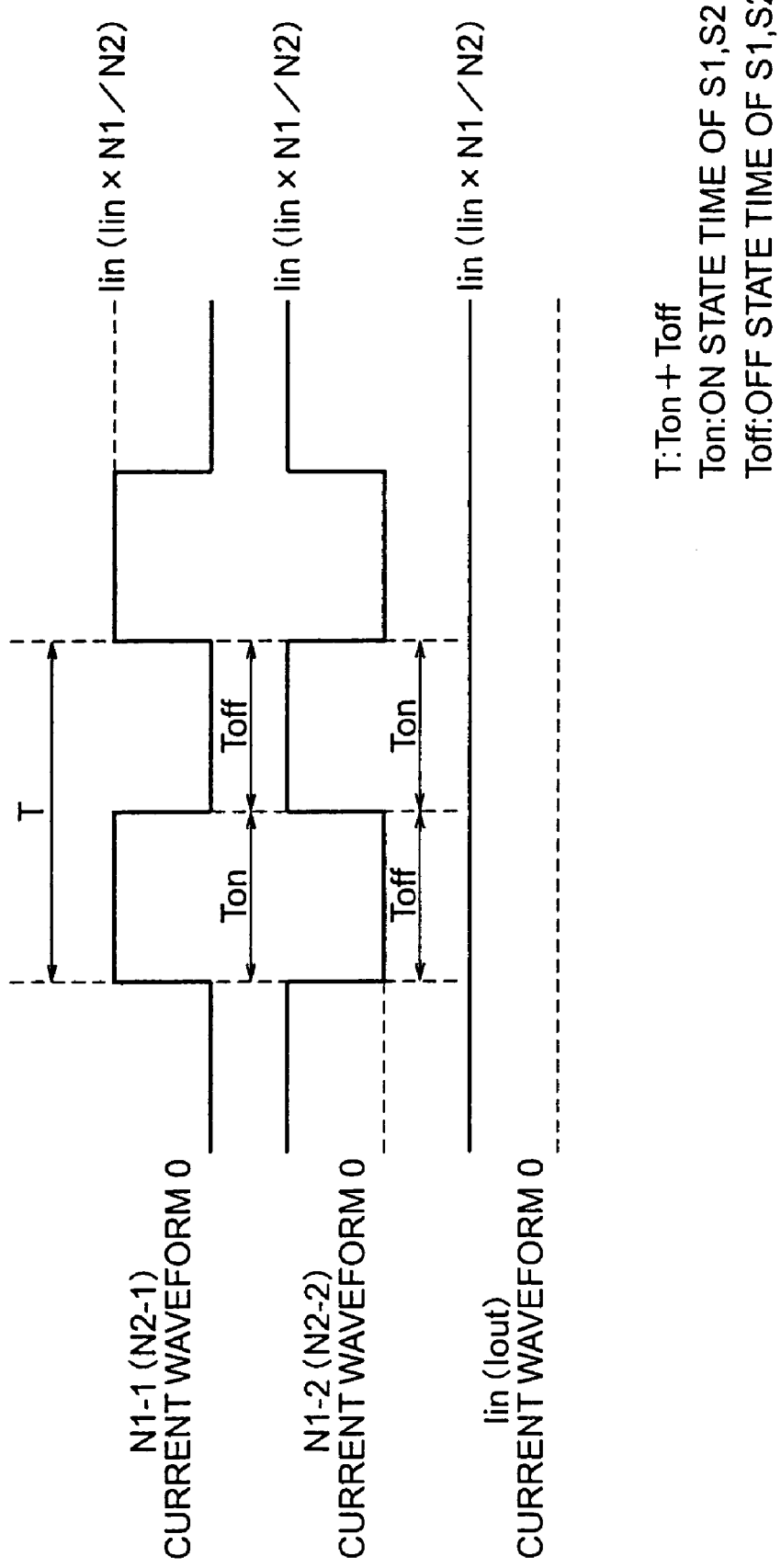
FIG. 7 is a waveform chart for describing an operation of the submarine power feeding branching device of FIG. 6 in a case where switches included in the submarine power feeding branching device have a duty ratio of 50%.

FIG. 7 is a timing chart in a case where the switch S1, S2 has a duty ratio of 50% each. The duty ratio Rd is defined by:

$$Rd = (Ton/T) \times 100 \ [\%] \qquad (1).$$

In this case, the secondary current has the square waves with intensity Iout when the transformer TR1 has a turns ratio of N1/N2. The intensity Iout is given by:

$$Iout = N1/N2 \times Iin \qquad (2).$$

Figure 8:
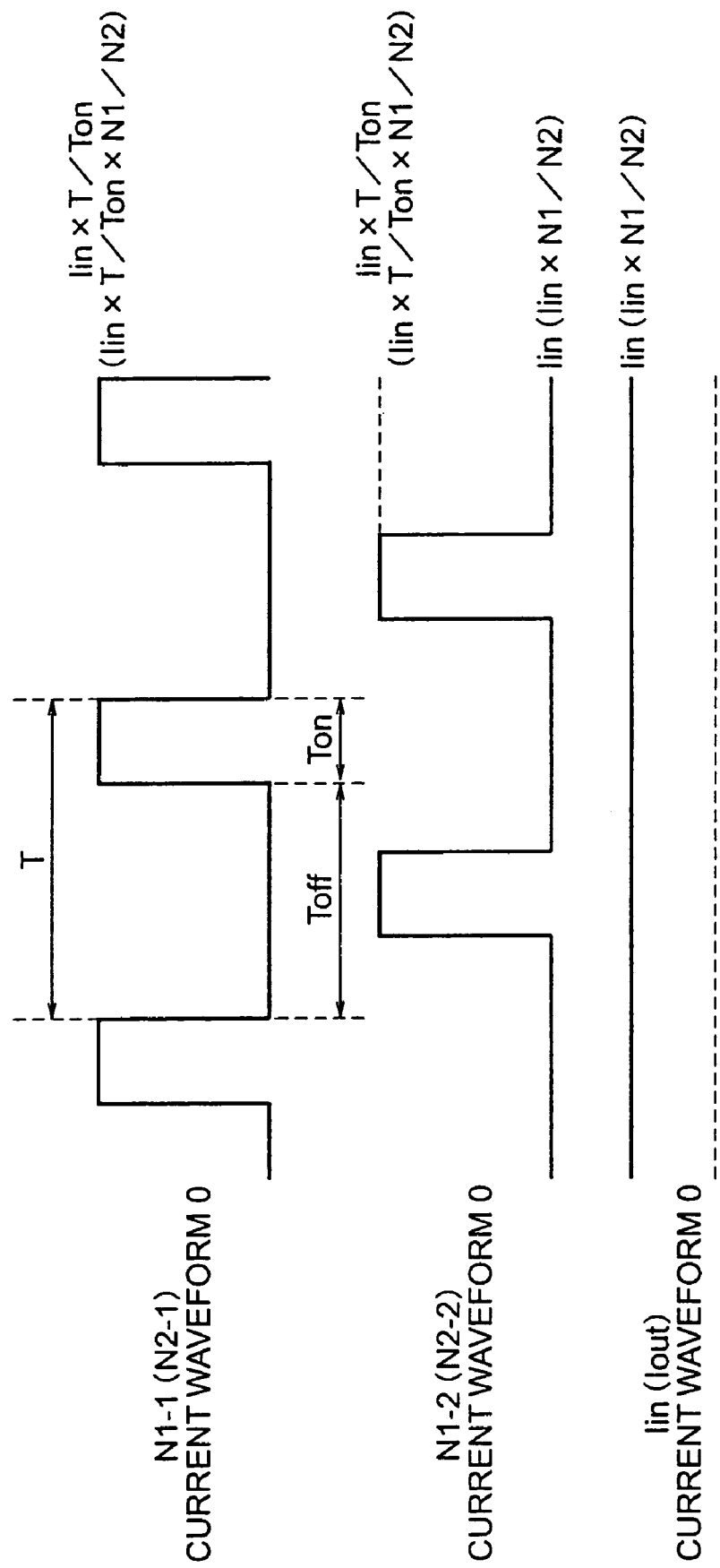
FIG. 8 is another waveform chart for describing the operation of the submarine power feeding branching device of FIG. 6 in a case where the switches have another duty ratio under 50%.

FIG. 8 is a timing chart in a case where the switch S1 and S2 has a common duty ration smaller than 50%. As shown in the bottom of FIG. 8, the input terminal 65 receives the first constant current with the intensity Iin regardless of the switches S1 and S2. Accordingly, the condenser C1 is charged with the first constant current Iin when both the switches S1 and S2 are in the off state. If either the switch S1 or S2 turns into the on state, electric charges charged in the condenser C1 is supplied to the transformer TR1. At this time, the primary side current flowing in the primary winding of the transformer TR1 has intensity I1 given by:

$$I1 = T/(2Ton) \times Iin \qquad (3).$$

Furthermore, the secondary side current flowing in the secondary winding of the transformer TR2 has intensity I2 given by:

$$\begin{aligned} I2 &= N1/N2 \times I1 \\ &= N1/N2 \times T/(2Ton) \times Iin. \end{aligned} \qquad (4)$$

In addition, the output current has intensity Iout which is equal to average of the secondary side current I2. The intensity Iout of the output current is given by:

$$\begin{aligned} Iout &= (2Ton)/T \times I2 \\ &= N1/N2 \times Iin. \end{aligned} \qquad (5)$$

The formula (5) is identical to the formula (2). This shows that the output current supplied to the output terminal 67 is fixed even if the duty ratio is varied on condition that the duty ratio is smaller than 50%. Accordingly, it is possible to solve problems which occurs when the switches S1 and S2 are in the on state at the same time. When the switches S1 and S2 are in the on state at the same time, the primary winding short circuits and the electric charges charged in the condenser C1 are suddenly discharged therefrom. The sudden discharge of the condenser C1 is likely to bring any troubles to the transformer TR1 and/or the condenser C1.

The submarine power feeding branching devices 53a and 53b which companion to each other substantially equally share feeding power fed to the branch submarine cable 54a (54b, 54c, or 54d) in the submarine power feeding system of FIG. 1. Thus, the submarine power feeding branching device 53a must be adjusted and stabilized in the submarine power feeding system of FIG. 1 so that the output current thereof has the same intensity as that of the output current from the submarine power feeding branching device 53b which companions thereto.

The description will be made about the adjustment for the submarine power feeding branching device 53a and stability thereof in the following.

At first, the description is directed to the adjustment of the output current for the submarine power feeding branching device 53a.

Figure 9:
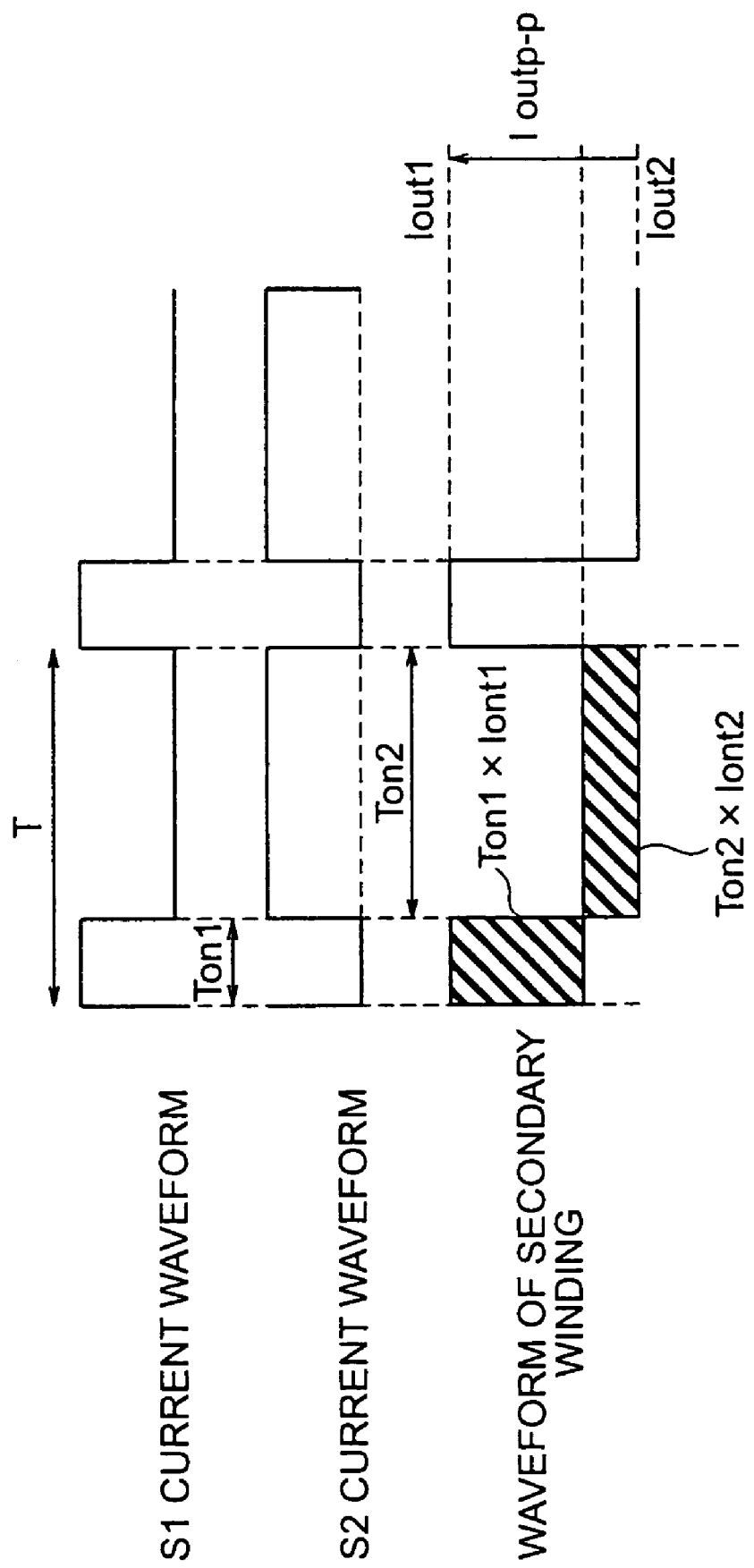
FIG. 9 is still another waveform chart for describing the operation of the submarine power feeding branching device of FIG. 6 in a case where the switches have different duty ratios.

FIG. 9 is a timing chart of the switches S1 and S2. In FIG. 9, the switches S1 and S2 are different from each other in duty ratio. FIG. 9 also shows a waveform of the secondary side current in the secondary winding of the transformer TR1.

Here, the duty ratio Rd1 of the switch S1 is represented by Ton1/T while the duty ratio Rd2 of the switch S2 is represented by Ton2/T. In addition, the period T is given by:

$$T = Ton1 + Ton2 \quad (6).$$

The formula (3) can be rewritten as follow.

$$Rd1 + Rd2 = 1 \quad (7)$$

The secondary current has intensity Iout1 during a period of Ton1 and intensity Iout2 during a period Ton2. Therefore, the secondary current has peak to peak intensity Ioutp-p given by:

$$Ioutp\text{-}p = Iout1 + Iout2 \quad (8).$$

In addition, by the use of the turns ratio N2/N1, the peak to peak intensity Ioutp-p given by:

$$Ioutp\text{-}p = N2/N1 \times Iin \quad (9).$$

Furthermore, because a direct current is not transferred from the primary winding to the secondary winding, the following formula is valid.

$$Ton1 \times Iout1 = Ton2 \times Iout2 \quad (10)$$

The output current Iout, which is obtained by rectified, is represented by:

$$Iout = (Ton1 \times Iout1 + Ton2 \times Iout2)/T \quad (11).$$

By arranging the formulas (6) to (11), the following formula is obtained.

$$Iout = 4Rd1(1/Rd1) \times N2/N1 \times Iin \quad (12).$$

Figure 10:
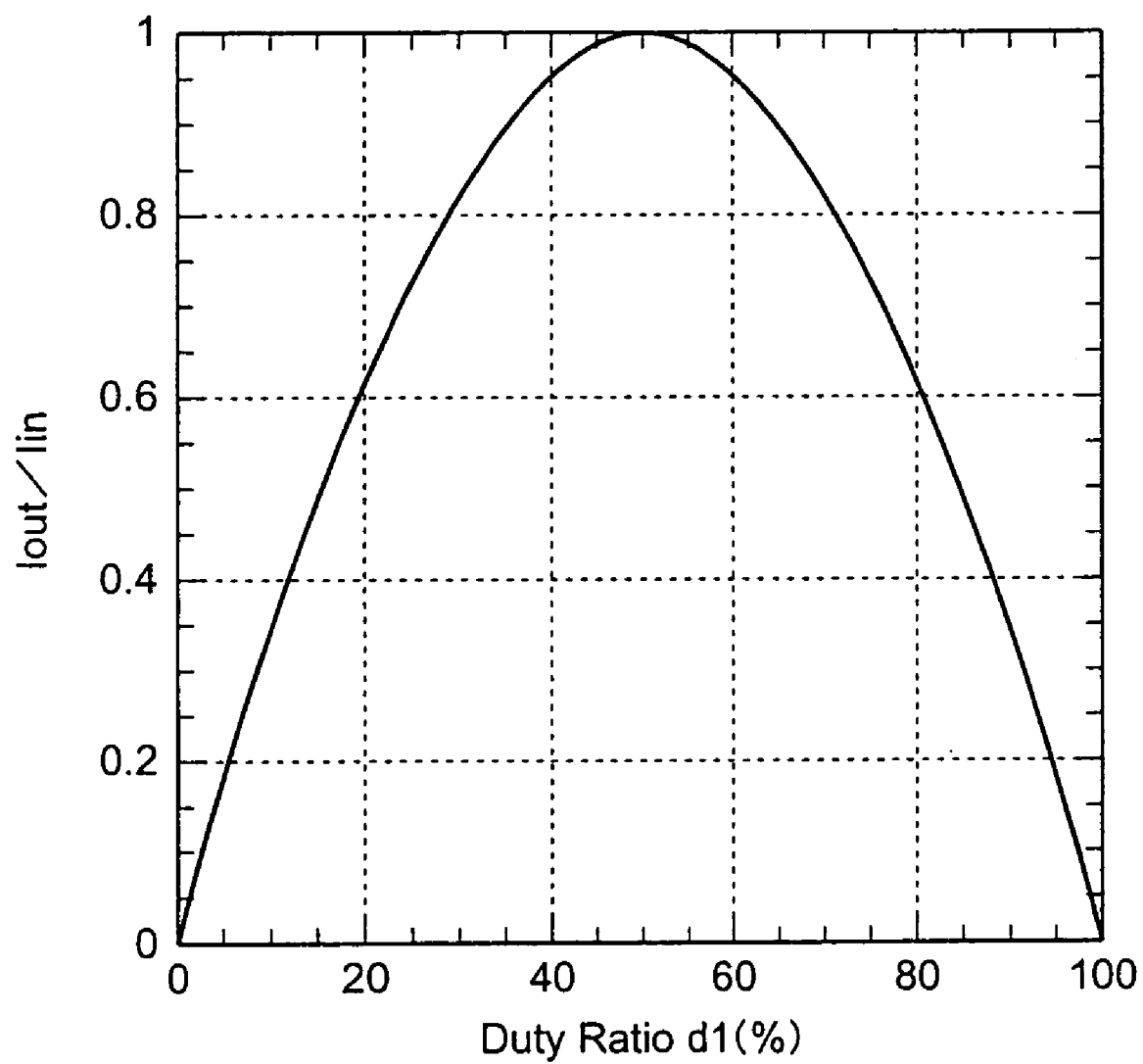
FIG. 10 is a graph representing a relation between a duty ratio Rd1 and a ratio of an output current to an input current.

From the formula (12), a relation between the duty ratio Rd1 of the switch S1 and an output current-input current ratio Iout/Iin is derived. FIG. 10 shows a graph representing the derived relation between Rd1 and Iout/Iin.

As understood from FIG. 10, when the duty ratio Rd1 is equal to 50%, the secondary side current Iout has a maximum value of N2/N1×Iin. When the duty ratio Rd1 is equal to 0% or 100%, the secondary side current Iout has a minimum value of zero. Thus, the secondary side current Iout varies according to the duty ratio Rd1 (and Rd2). In other words, the secondary side current Iout can be controlled by the changing the duty ratios Rd1 and Rd2.

Next, the description is directed to the stability of the pair of the submarine power feeding branching devices 53a and 53b which are adjusted to match the output currents produced by the pair.

Figure 11:
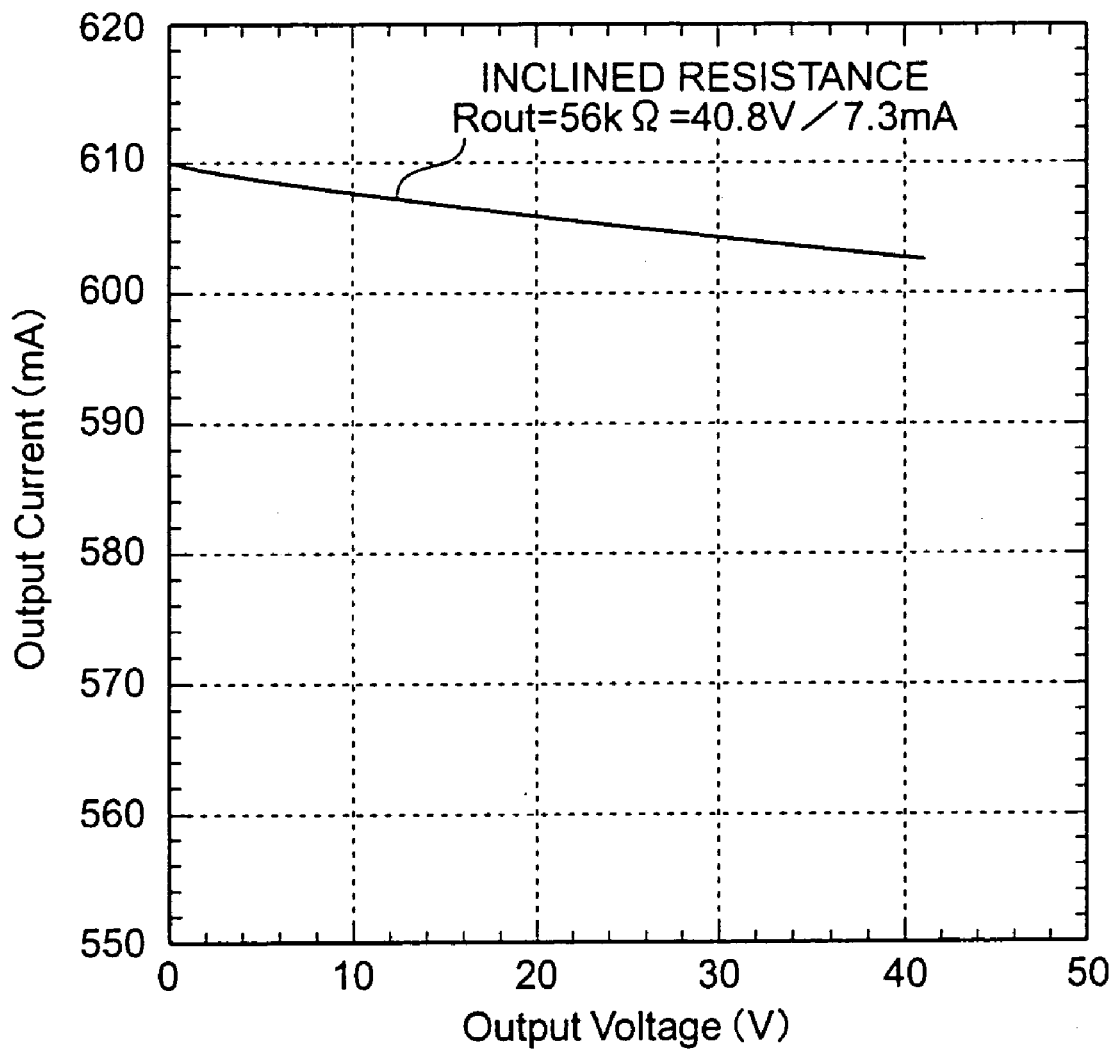
FIG. 11 is a graph representing measured output voltage-current characteristics of a current-current converter as used in the submarine power feeding branching device of FIG. 6.
Figure 12:
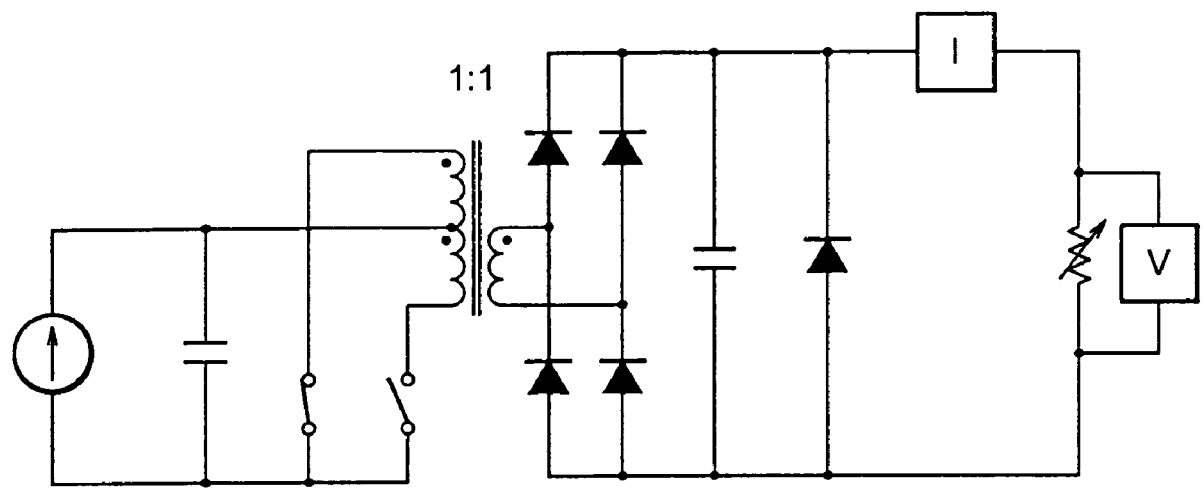
FIG. 12 is a circuit diagram of a measurement circuit for measuring the output voltage-current characteristics shown in FIG. 11.

FIG. 11 is a graph representing a measured output voltage-current characteristics of a current-current converter which can be used for the constant current-constant current transformer T1. The output voltage-current characteristics has been measured by a measurement circuit as shown in FIG. 12. As shown in FIG. 12, the measurement circuit comprises a current generator connected to an input side of the current-current converter. A variable resister is connected to an output side of the current-current converter. The measurement has been made as resistance of the variable resister has been varied.

Returning to FIG. 11, the output current decreases from 609.8 [mA] to 602.5 [mA] as the output voltage increases from 0.3 [V] to 41.1 [V]. That is, the output voltage variation of 40.8 [V] ($\Delta V=41.1-0.3$) is in conjunction with the output current variation of 7.3 [mA] ($\Delta I=609.8-602.5$). This is because a transformer for the current-current converter has output impedance which decreases the output voltage with the increment of the output current. Here, a ratio of the output voltage variation $\Delta V$ to the output current variation $\Delta I$ is referred to as an inclined resistance Rout ($=\Delta V/\Delta I=5.6$ k$\Omega$).

The pair of the submarine power feeding branching devices 53a and 53b connected to each other through the branch submarine cable 54a (54b, 54c, or 54d) have such inclined resistance Rout each. Accordingly, the pair of the submarine power feeding branching devices 53a and 53b are stabilized by the inclined resistance Rout when they are adjusted to match their output currents to each other.

Figure 13:
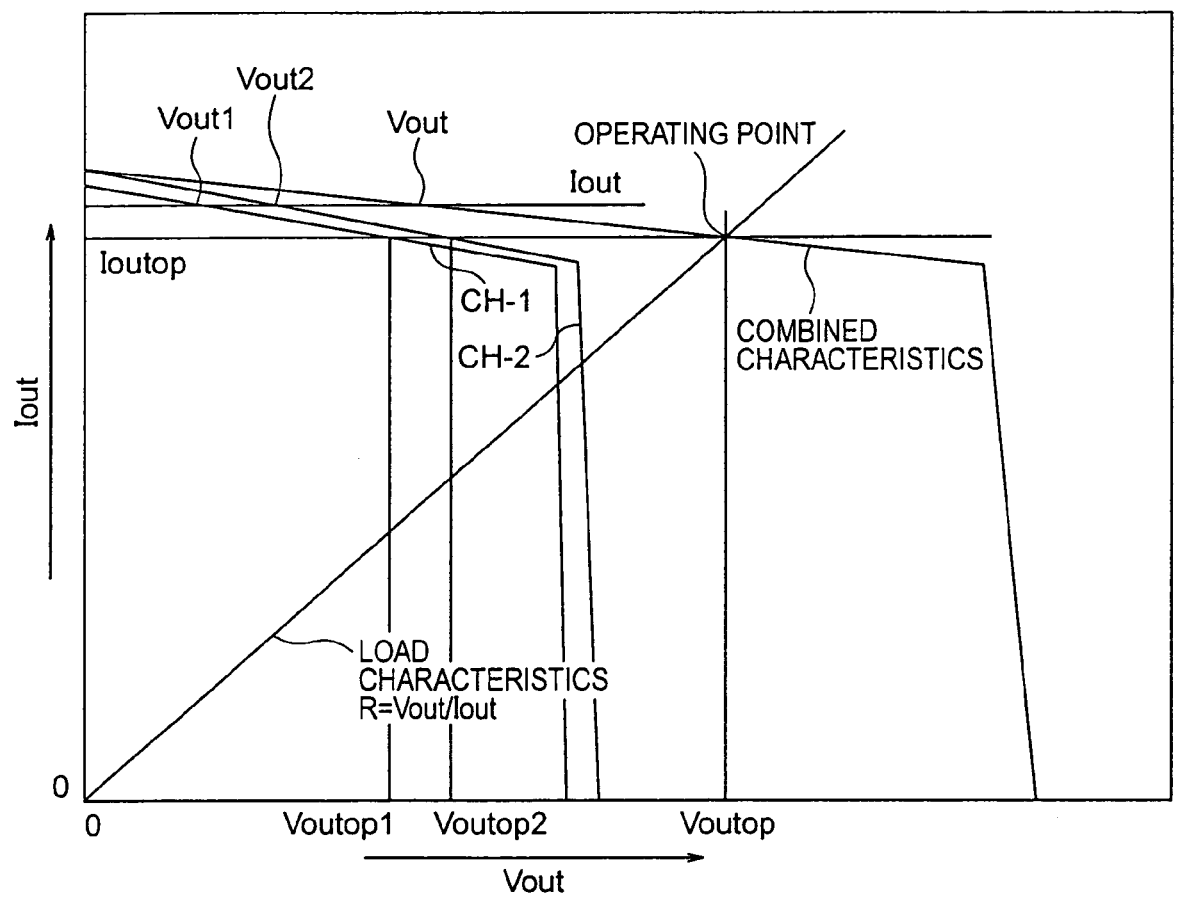
FIG. 13 is a graph for describing an operation point of a combined device of two submarine power feeding branching devices as shown in FIG. 6.

FIG. 13 shows output voltage-current characteristics of the submarine power feeding branching devices 53a and 53b connected to each other through the branch submarine cable 54a together with their operating voltages and currents. For brevity's sake, load resistance R represents the total of conductor resistance of the branch submarine cable 54a and electric resistance of the submarine repeater(s) interposed in the branch submarine cable 54a.

In FIG. 13, two graphs of the output voltage-current characteristics of the submarine power feeding branching devices 53a and 53b are labeled "CH-1" and "CH-2" respectively. Each of the submarine power feeding branching devices 53a and 53b is restricted within a predetermined output voltage. The submarine power feeding branching devices 53a and 53b always have a common output current Iout because they are connected in series.

As illustrated in FIG. 13, if the output current Iout is equal to a certain value 10, the submarine power feeding branching devices 53a and 53b must produce the output voltages Vout1 and Vout2, respectively. Here, assuming that the submarine power feeding branching devices 53a and 53b forms a combined device, an output voltage Vout of the combined device is given by:

$$Vout = Vout1 + Vout2.$$

Accordingly, output voltage-current characteristics of the combined device can be obtained by the use of the output current Iout as a parameter. A graph of the output voltage-current characteristics of the combined device are depicted in FIG. 13 and labeled "COMBINED CHARACTERISTICS".

In Consideration of the load resistance R, a graph of load characteristics can be depicted in FIG. 13. The load characteristics are given by:

$$V\text{out} = R \times I\text{out}.$$

The combination device has an operation point which corresponds to an intersection between the graph of the output voltage-current characteristics of the combined device and the graph of the load characteristics. At the operation point, the output voltage has a value of Voutop while the output current has a value of Ioutop. Operation voltages Voutop1 and Voutop2 of the submarine power feeding branching devices 53a and 53b are obtained by the use of the output current Ioutop. Because the operation point is the intersection of the two graphs, it is stable.

The inclined resistance described previously makes possible to find the stable operation point for the combined device. If each of the submarine power feeding branching device of the combined device is an ideal current generator, the inclined resistance is infinite and the combined device can not share feeding power. That is, one of ideal current generators is charged with the feeding power while the other has the output voltage of 0 [V] in such a case.

As mentioned above, by the use of the submarine power feeding branching device 53a having the structure of FIG. 6 and the power feeding branching device 53b having the same structure as shown in FIG. 6, the submarine power feeding system as illustrated in FIG. 5 can be constructed.

In the submarine power feeding system of FIG. 5, the constant current feeding devices 51a, 51b and 51c provided on land feed first constant currents to the submarine power feeding branching devices 53a and 53b through the trunk submarine cables 52a, 52b and 52c. The submarine power feeding branching devices 53a and 53b uses the first constant currents from the constant current feeding devices 51a, 51b and 51c as power sources to feed second constant currents for the submarine repeaters 55 through the branch submarine cables 54a, 54b, 54c and 54d. The submarine power feeding branching devices 53a and 53b which make a pair produce the second constant currents flowing in opposite direction and having identical intensity. The pair of the submarine power feeding branching devices 53a and 53b about equally share feeding power between them. A plurality of the submarine power feeding branching devices 53a and/or 53b can be provided along each trunk submarine cables 52a, 52b or 52c. Therefore, the trunk submarine cables 52a, 52b and 52c and the branch submarine cables 54a to 54d can be widely spread in mesh or lattice pattern. In consequence, the submarine repeaters (and the submarine observation devices) can be widely arranged in second dimensional arrangement (or matrix).

As understood from FIG. 6, each of the submarine power feeding branching devices 53a and 53b can efficiently produce the second constant current because it includes no element which wastes electric power.

Furthermore, each submarine power feeding branching device 53a or 53b allows electrical potential difference between the trunk submarine cable and the branch submarine cable which are connected thereto. This is because the submarine power feeding branching device is isolated between the input side and the output side thereof. Therefore, the submarine power feeding branching device make possible to construct various power feeding system flexibly.

In addition, the submarine power feeding branching device can produce the second constant current having equal intensity with the first constant current supplied thereto. Accordingly, the submarine power feeding branching device makes possible to construct the power feeding system that the first constant current on each trunk submarine cable is equivalent to the second constant current on each branch submarine cable. In such a system, the submarine repeater can be interposed in either the trunk submarine cable or the branch submarine cable.

Figure 14:
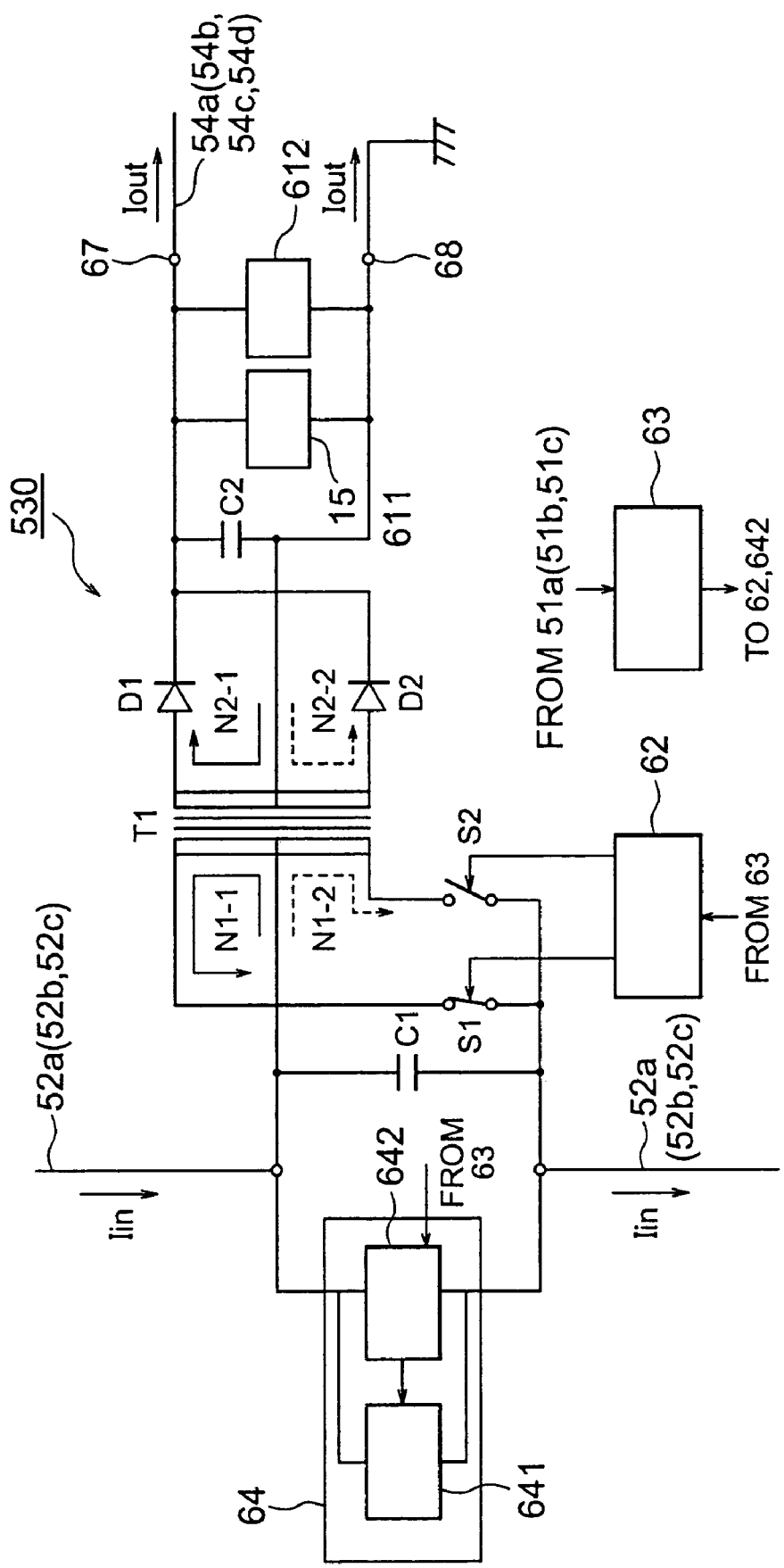
FIG. 14 is a schematic circuit diagram of a submarine power feeding branching device according to a second embodiment of this invention.

Referring to FIG. 14, the description will be made about a submarine power feeding branching device according to a second embodiment of this invention. The submarine power feeding branching device 530 is similar to that (53a) of FIG. 6 but has an additional resistor 612.

The additional resistor 612 is connected between the second output terminal 67 and the ground terminal 68. The additional resistor 612 reduces an inclined resistance R in comparison with that of the submarine power feeding branching device 53a of FIG. 6. Hereby, a combined device comprising the submarine power feeding branching device 530 and a similar device has a wide range of variable output current.

Figure 15:
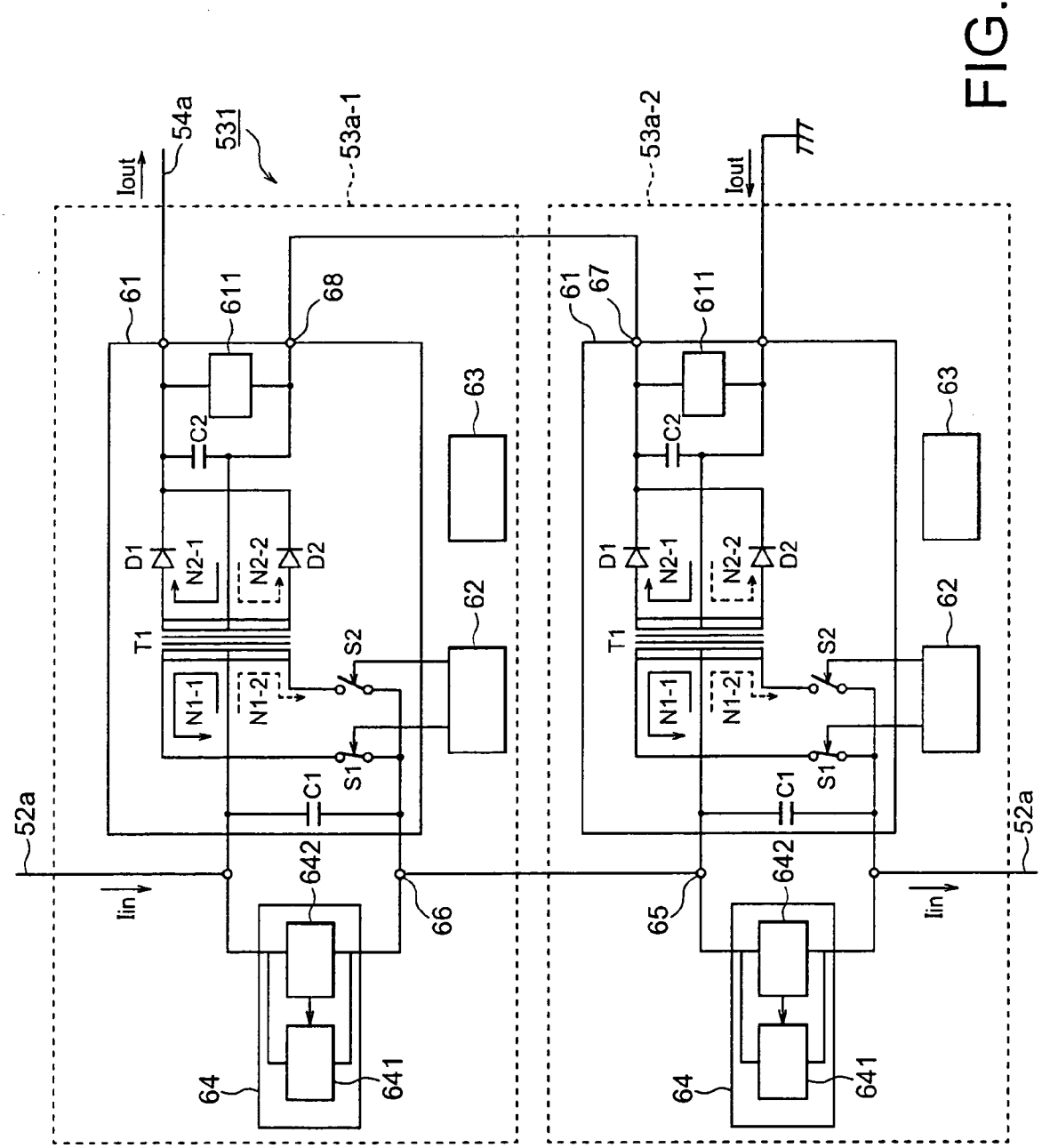
FIG. 15 is a schematic circuit diagram of a submarine power feeding branching device according to a third embodiment of this invention.

Referring to FIG. 15, the description will be made about a submarine power feeding branching device according to a third embodiment of this invention. The submarine power feeding branching device 531 comprises two submarine power feeding branching devices 53a of FIG. 6.

As shown in FIG. 15, the first output terminal 66 of the submarine power feeding branching device 53a-1 is connected to the input terminal 65 of the submarine power feeding branching device 53a-2. Furthermore, the first ground terminal 68 of the submarine power feeding branching device 53a-1 is connected to the second output terminal 67 of the submarine power feeding branching device 53a-2.

For normal operation, the submarine power feeding branching devices 53a-1 and 53a-2 must produce identical output currents. This can be made by controlling the duty ratio of the switches S1 and S2 in each constant current-constant current converter 61. That is, in each of the submarine power feeding branching devices 53a-1 and 53a-2, the output current is adjusted by controlling the duty ratio of the switches S1 and S2. Both of the submarine power feeding branching devices 53a-1 and 53a-2 are stabilized by the effect of the inclined resistors of them. Thus, the output currents of the submarine power feeding branching devices 53a-1 and 53a-2 matches with each other.

The submarine power feeding branching devices 531 can feed larger power for the branch submarine cable 54a because it can produce higher output voltage in comparison with that (53a) of FIG. 6.

Three or more submarine power feeding branching devices may be connected in serial to produce further larger output voltage.

Figure 16:
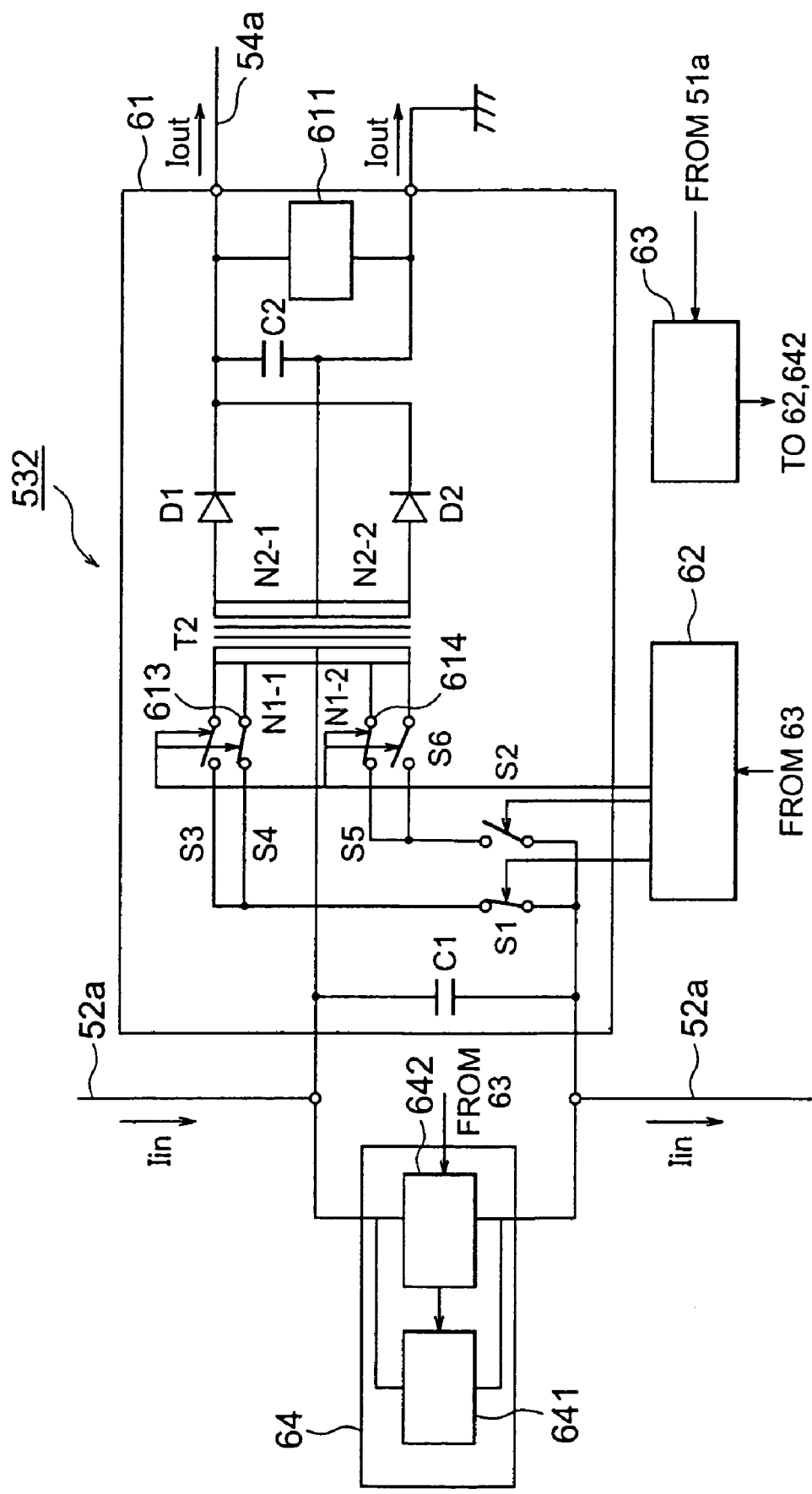
FIG. 16 is a schematic circuit diagram of a submarine power feeding branching device according to a fourth embodiment of this invention.

Referring to FIG. 16, the description will be made about a submarine power feeding branching device according to a fourth embodiment of this invention. The submarine power feeding branching device 532 is similar to that (53a) of FIG. 6 but has a transformer T2 instead of the transformer T1. The transformer T2 differs from the transformer T1 in that it has taps 613 and 614 provided along the primary winding. The taps 613 and 614 are equidistant from the midpoint of the primary winding.

The submarine power feeding branching device 532 further comprises third to sixth switches S3-S6. The third switch S3 is connected between the first switch S1 and one end of the primary winding. The forth switch S4 is connected between the first switch S1 and the tap 613 nearer the end of the primary winding that is connected to the third switch S3. The fifth switch S5 is connected between the second switch S2 and the tap 614 nearer the other end of the primary winding. The sixth switch S4 is connected between the second switch S2 and the other end of the primary winding.

The switch controller 62 performs a different operation to control not only the switches S1 and S2 but also the switches S3-S6. The switch controller 62 receives a control signal transmitted from the land station through the communication device 63 and controls the switches S1-S6 according to the control signal.

While the switch controller 62 turns switches S3 and S6 on and turns switches S4 and S5 off, the submarine power feeding branching device 532 can operate in the same manner as the submarine power feeding branching device 53a of FIG. 6. On the other hand, while the switch controller 62 turns switches S3 and S6 off and turns switches S4 and S5 on, active length of the primary winding is shorter than that of FIG. 6. That is, the turns ration N2/N1 is larger than that of FIG. 6 in this case. Thus, the submarine power feeding branching device 532 can have a wide range of variable output current in comparison with the submarine power feeding branching device 532.

While this invention has thus far been described in conjunction with the few embodiments thereof, it will readily be possible for those skilled in the art to put this invention into practice in various other manners. For example, the submarine repeater may be provided along the trunk submarine cable. Furthermore, a device such as the submarine power feeding branching device of FIG. 15 may be made by using the submarine power feeding branching device of FIG. 14 or 16. In addition, the submarine power feeding branching device of FIG. 16 may comprise a resistor 612 as shown in FIG. 14.

What is claimed is:

1. A power feeding system including a plurality of trunk cables connected to feeding devices, a plurality of branch cables each of which is provided between adjacent two of said trunk cables, and a plurality of power feeding branching devices for connecting said branch cables with said trunk cables, wherein each of said power feeding branching devices comprises:

a constant current-constant current converter having an input terminal, a first output terminal and a second output terminal which is electrically isolated from both said input terminal and said first output terminal; and a controller connected to said constant current-constant current converter for making said constant current-constant current converter utilize a first constant current supplied to said input terminal to produce a second constant current and a restored first constant current which are to be supplied to said second output terminal and said first output terminal, respectively.

2. A power feeding system as claimed in claim 1, wherein said power feeding branching devices are classified into two types, one of the types leading the second constant current from said constant current-constant current converter to said second output terminal, the other of the types leading the second constant current from said second output terminal to constant current-constant current converter, and wherein:

each of said branch cables is connected between two second output terminals of two of said power feeding branching devices different from each other in type.

3. A power feeding system as claimed in claim 2, wherein said power feeding branching devices connect said branch cables with said trunk cables to form a lattice pattern.

* * * * *